United States Patent [19]

Ishii et al.

[11] Patent Number: 5,413,880
[45] Date of Patent: May 9, 1995

[54] OXYGEN ION CONDUCTOR AND SOLID FUEL CELL

[75] Inventors: Takao Ishii, Mito; Tsunekazu Iwata, Nakaminato; Yukimichi Tajima, Katsuta, all of Japan

[73] Assignee: Nippon Telegraph and Telephone Corporation, Tokyo, Japan

[21] Appl. No.: 61,109

[22] Filed: May 14, 1993

[30] Foreign Application Priority Data

Aug. 12, 1992 [JP] Japan ................................. 4-215303
Dec. 15, 1992 [JP] Japan ................................. 4-334507

[51] Int. Cl.⁶ ........................ H01M 8/12; C04B 35/48
[52] U.S. Cl. ................................ 429/33; 429/30; 252/520
[58] Field of Search ................ 429/33, 30; 423/600; 252/520

[56] References Cited

U.S. PATENT DOCUMENTS 3,776,777 12/1973 Houpert et al. ........................ 429/33
4,851,293 7/1989 Egerton et al. .................. 423/600 X

FOREIGN PATENT DOCUMENTS

19525/83 9/1983 Australia .
750995 1/1967 Canada ........................... 429/33
0424732A1 10/1990 European Pat. Off. .
1375469 9/1964 France .
1048839 11/1966 United Kingdom .

OTHER PUBLICATIONS

S. P. S. Badwal, Electrochemical Behaviour of the Surface Treated Composite-Electrolyte/Electrode Interface, J. Applied Electrochemistry 14 (1984) (no month) pp. 379–387.
Inozemtsev, M. "Effect of Additions of Impurities on the Electrical Properties of a Solid Oxide Electrolyte", Chemical Abstracts, vol. 83, No. 24, 15 Dec. 1975, Abstract No. 200671v.
Bannister, M. J. et al., The Cubic Tetragonal Equilibrium in the System Zirconia–Scandia at 1800° C.: Effect of Alumina, J. of Materials Science Letters 2 (Oct. 1983) pp. 561–564.
S. P. S. Badwal et al., The $Sc_2O_2$–$ZrO_2$–$Al_2O_3$ System: Electrical Conductivity and Microstructure, J. of the Australian Ceramic Society, vol. 20, No. 2, 1984, (no month) pp. 28–31.
European Search Report, Dec. 7, 1993 in EP 93 40 1258 with Annex.

*Primary Examiner*—John S. Maples
*Attorney, Agent, or Firm*—Finnegan, Henderson, Farabow, Garrett & Dunner

[57] ABSTRACT

The present invention relates to an oxygen ion conductor consisting of a composition consisting of (1-x-y)$ZrO_2$—$xSc_2O_3$—$yAl_2O_3$, and to solid fuel cells employing this ion conductor as the solid electrolyte. In order to obtain more desireable characteristics in the aforementioned composition, it is preferrable to apply limits to the composition such that: $0.05 < x+y \leq 0.16$ and $x>0$, $y>0$, or, alternatively, such that: $0.07 \leq x+ \leq 0.13$ and $0.005 \leq y \leq 0.02$. In the present invention phase transitions occuring during temperature change from room temperature to high temperatures are eliminated and mechanical strength with respect to the heat cycle is increased by adding as a secondary dopant a specific quantity of $Al_2O_3$ to a specific $ZrO_2$—$Sc_2O_3$ system composition which has a high degree of ion conductivity.

4 Claims, 6 Drawing Sheets

OXYGEN ION CONDUCTOR AND SOLID FUEL CELL

BACKGROUND OF THE INVENTION

1. Technical Field

The present invention relates to an oxygen ion conductor and a solid fuel cell.

2. Technical Background

In recent years there has been increasing interest in solid oxide fuel cells in which oxygen ion conductor is used as an electrolyte. In particular, from the aspect of effective energy utilization, solid fuel cells have such excellent advantages as having an intrinsic high energy conversion efficiency which is not restricted by Carnot's efficiency, and being environmentally safe.

Conventionally, oxygen ion conductors have held the greatest degree of promise as the electrolyte for use in a solid oxide fuel cell. However, in order to obtain a sufficient degree of ion conductivity in $Y_2O_3$ stabilized $ZrO_2$ (yttria stabilized zirconia: YSZ), which is one type of conventionally known oxygen ion conductor, high temperature operations of 1000° C. are necessary.

In other words, in a construction wherein an oxygen electrode, a solid electrolyte and a fuel electrode are laminated, when an oxygen gas concentration gradient is applied at both sides of the solid electrolyte, the oxygen ions diffuse throughout the solid electrolyte and a fuel cell is formed by means of an electrochemical reaction at the interface of the electrodes. When solid oxide fuel cells are operated at 1000° C., reactions arise at the interface between the solid electrolyte and the fuel electrolyte, causing deterioration.

Namely, because the deterioration in the life of the components due to reactions between the electrode and electrolyte becomes severe at high temperatures such as noted above, the practical application of solid fuel cells has been delayed. Because, from this point of view, it is desireable to lower the operation temperature, the realization of an ion conductor material having a degree of ion conductivity which is higher than that of YSZ is desired.

In general, in a zirconia system oxygen ion conductor, the ion conductivity tends to increase as the ionic radius of the dopant becomes smaller. This is because, as the size of the ionic radius of the dopant approaches the size of the ionic radius of $Zr^{4+}$, the activation energy of the mobile oxygen ion becomes smaller. In fact, it is known that, of zirconium system oxygen ion conductors, a $ZrO_2$—$Sc_2O_3$ system oxygen ion conductor shows the highest degree of ion conductivity.

However, accompanying an increase in the dopant, the crystal structure of the oxygen ion conductor changes from monoclinic to rhombohedral to cubic. Further, there is an additional problem in that, within the region in which a maximum value can be attained for ion conductivity, the rhombohedral crystal structure becomes stable at room temperature, while the cubic crystal structure is not stable. Moreover, at temperatures above 650° C., when a heat cycle is provided such that temperature conditions exceed 650° C. in order to accomplish structural phase transition to a cubic crystal structure, fracturing is brought about easily. Thus, practical application as a solid electrolyte material is not possible.

SUMMARY OF THE INVENTION

Therefore, it is an object of the present invention to provide an oxygen ion conductor which has a high degree of ion conductivity as compared to YSZ, which undergoes no structural transformations even when subjected to a heating cycle from room temperature to high temperatures, and which can be practically utilized as a solid electrolyte in a fuel cell. Moreover, it is a further object of the present invention to provide a solid fuel cell in which this oxygen ion conductor is utilized.

In their research into oxygen ion conductors, the present inventors first attempted to explain the reason why exfoliation is caused between the electrode and electrolyte when a $ZrO_2$—$Sc_2O_3$ system ion conductor is used in a fuel cell as the solid electrolyte. As a result of their research, the inventors are able to propose the following explanation for this phenomena.

Namely, accompanying an increase in the dopant, the crystal structure of the oxygen ion conductor changes from monoclinic to rhombohedral to cubic. Further, there is an additional problem in that, within the region in which a maximum value can be attained for the degree of ion conductivity, it is the rhombohedral crystal structure, and not the cubic crystal structure, which is stable at room temperature. Further, because the crystal structure undergoes a structural change to a cubic crystal structure at temperatures above 650° C., it is believed that the fracturing in the heat cycle occurs because of the difference in the coefficients of thermal expansion for the cubic crystal structure and the rhombohedral crystal structure.

The present inventors therefore set about determining a means by which to prevent the aforementioned phase transformation, carrying out intensive research involving numerous experiments and original techniques. However, this research revealed that it was not sufficient to merely prevent the phase transformation of the oxygen ion conductor, but rather it was also necessary to simultaneously maintain an ion conductivity which is higher than that of YSZ.

Further, in a process involving numerous experiments, the inventors discovered that in the oxygen ion conductor of the aforementioned system, a stable phase structure can be obtained when, in addition to Sc, a sub dopant is added and, moreover, that this stable phase structure shows a high degree of ion conductivity.

From additional experiments conducted at this point, it was discovered that when a portion of Sc is substituted with Al, the third valence of which is stable, it is possible to obtain a cubic crystal structure which is stable.

Furthermore, it was also understood that the total amount of the main dopant Sc and the sub dopant added to the oxygen ion conductor of the aforementioned system is a factor in the fluctuation in the degree of ion conductivity. When the quantity of the main dopant Sc and the sub dopant added is within a certain limited range, it is possible to obtain an even higher degree of conductivity.

In one preferred embodiment of the present invention, the oxygen ion conductor consists of a composition consisting of $(1-x-y)ZrO_2$—$xSc_2O_3$—$yAl_2O_3$.

Namely, the oxygen ion conductor obtained according to the present invention includes Sc as the main dopant. Because the ionic radius of Sc is close to that of Zr, the oxygen ion moves more easily than YSZ. For this reason, it is possible to realize a degree of ion conductivity which is remarkably large at low temperatures as compared to YSZ.

Furthermore, in the present invention, Al, the third valence of which is stable, is added as the sub dopant. The degree of ion conductivity resulting from the addition of this sub dopant showed either a value at which the characteristics of the $ZrO_2$—$Sc_2O_3$ system were maintained, or a value slightly lower than this. Further, the cubic crystal structure was stable, and crystal transformations did not appear at high temperatures. In this case, $Al_2O_3$ is not added as the sintering additive which is generally used when manufacturing ceramics, but rather functions as an additive to control crystal transformation.

In another preferred embodiment of the present invention, the oxygen ion conductor consists of a composition consisting of $(1-x-y)ZrO_2$—$xSc_2O_3$—$yAl_2O_3$ (where: $0.05 < x+y \leq 0.16$, and $x > 0$, $y > 0$).

By setting the limits for this composition as above, the degree of ion conductivity becomes higher than that of YSZ.

In another preferred embodiment of the present invention, the oxygen ion conductor consists of a composition consisting $(1-x-y)ZrO_2$—$xSc_2O_3$—$yAl_2O_3$ (where: $0.07 \leq x+y \leq 0.13$, and $0.005 \leq y \leq 0.02$).

When the additives are added within the ranges as limited above, it is possible to obtain an oxygen ion conductor in which there is no phase transformation, and which has an even higher degree of oxygen conductivity. Further, by adding a variety of oxides to $ZrO_2$, a degree of oxygen conductivity which is higher than that of such conventional two component derived ion conductors which are stable at the cubic crystal structure is demonstrated. From this composition, it is possible to obtain a superior ion conductor in which phase transformation does not occur even when the ion conductor is subjected to a heating cycle ranging from room temperature to 1000° C.

In another preferred embodiment of the present invention, a solid fuel cell is formed using as the solid electrolyte an oxygen ion conductor consisting of a composition consisting of $(1-x-y)ZrO_2$—$xSc_2O_3$—$yAl_2O_3$.

In another preferred embodiment of the present invention, a solid fuel cell is formed using as the solid electrolyte an oxygen ion conductor consisting of a composition consisting of $(1-x-y)ZrO_2$—$xSc_2O_3$—$yAl_2O_3$ (where: $0.05 < x+y \leq 0.16$ and $x > 0$, $y > 0$).

In another preferred embodiment of the present invention, a solid fuel cell is formed using as the solid electrolyte an oxygen ion conductor consisting of a composition consisting of $(1-x-y)ZrO_2$—$xSc_2O_3$—$yAl_2O_3$ (where: $0.07 \leq x+y \leq 0.13$ and $0.005 \leq y \leq 0.02$).

Further, the present inventors learned that, when producing a $ZrO_2$—$Sc_2O_3$—$Al_2O_3$ system sintered body, while there is a slight reduction in ion conductivity when even a small amount of $SiO_2$ is added as the sintering additive, there is no change in the relative effects.

As a result of the above described structure, it is possible to offer an oxygen ion conductor which shows a high degree of ion conductivity, and which possesses high mechanical strength with respect to the heat cycle such that, for example, no exfoliation occurs between the electrodes.

The material of a $ZrO_2$—$Sc_2O_3$ system has the highest ion conductivity of any zirconium system, however, because of the instability of the crystal structure, it was previously not possible to employ this type of material. However, in the present invention, by adding a specific amount of $Al_2O_3$ as the secondary dopant, it is possible to provide a material which has a degree of ion conductivity which is two to four times greater than that of the conventionally used oxygen ion conductor YSZ, and moreover, which, as a result of stabilizing the cubic crystal structure at room temperature and above, has a high degree of mechanical strength with respect to the heat cycle and which shows only small changes in conductivity at high temperatures over time. Further, the present invention represents a large contribution to the low temperature operations of a solid fuel cell.

In another preferred embodiment of the present invention, a cell is formed by providing a fuel electrode and an oxygen electrode to both sides of the solid electrolyte consisting of a composition described above, and a solid fuel cell provided with one or a plurality of these cells is formed.

In another preferred embodiment of the present invention, a fuel electrode and an oxygen electrode are provided to both sides of a solid electrolyte consisting of a composition described above, and an interconnector is connected to the fuel electrode to form a solid fuel cell.

By forming a solid fuel cell of the structure as described above, it is possible to obtain a solid fuel cell having a high rate of ion conductivity, a high degree of the mechanical strength with respect to the heat cycle, and for which the changes in the rate of conductivity at high temperatures over time is small.

DESCRIPTION OF THE PREFERRED EMBODIMENTS

EXAMPLE 1

Observing the composition limits of $(1-x-y)ZrO_2-xSc_2O_3-yAl_2O_3$ (where: $0 < x+y < 0.16$, and $x > 0$, $y > 0$), the powdered materials were combined so as to attain the composition limits shown in Table 1, and then were well mixed to form pellets of a diameter of 2 mm and a thickness of 2 mm. These pellets were sintered for 60 hours at 1620° C. in air, and in this manner a plurality of test ion conductors were produced. After characterizing the crystal structure of the test materials using powder X-ray diffraction, the ion conductivity was determined from measurements of their complex impedance in the frequency range 10 Hz ~ 1 MHz with an impedance analyzer.

Figure 1A:
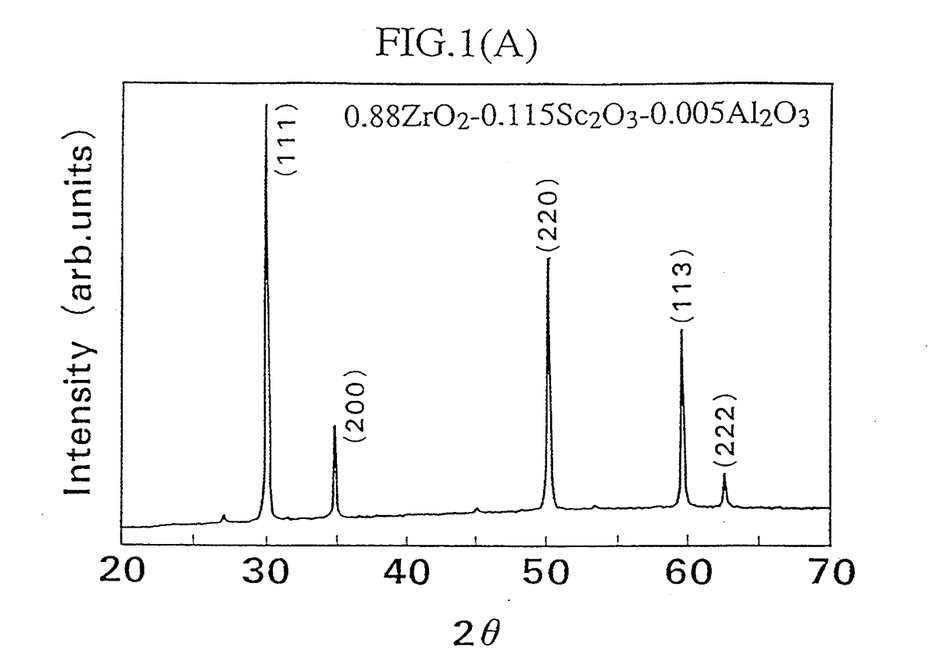
FIG. 1(a) is a diagram showing the X-ray diffraction pattern of a test oxygen ion conductor of the composition consisting of $(0.88)ZrO_2$—$(0.115)Sc_2O_3$—$(0.005)Al_2O_3$.
Figure 1B:
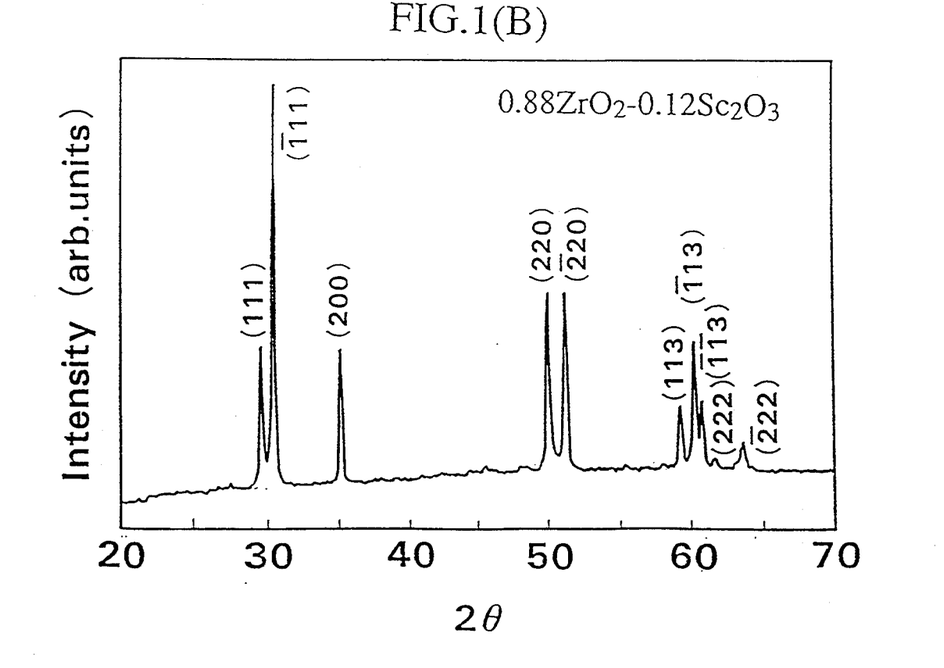
FIG. 1(b) is a diagram showing the X-ray diffraction pattern of a test oxygen ion conductor of the composition consisting of $(0.88)ZrO_2$—$(0.12)Sc_2O_3$.

FIG. 1(a) shows the X-ray diffraction pattern at room temperature of an oxygen ion conductor of the composition of $(0.88)ZrO_2-(0.115)Sc_2O_3-(0.005)Al_2O_3$. Additionally, for comparative purposes, the X-ray diffraction pattern of the oxygen ion conductor of the compositon of $(0.88)ZrO_2-(0.12)Sc_2O_3$, which does not contain $Al_2O_3$ as the sub dopant, is shown in FIG. 1(b).

When the dopant $Al_2O_3$ is not included, the rhombohedral phase is obtained as a single phase at room temperature. When this is heated to 650° C., a phase transformation to the cubic crystal structure occurs. However, by adding the sub dopant, the cubic crystal structure is stabilized.

Figure 2A:
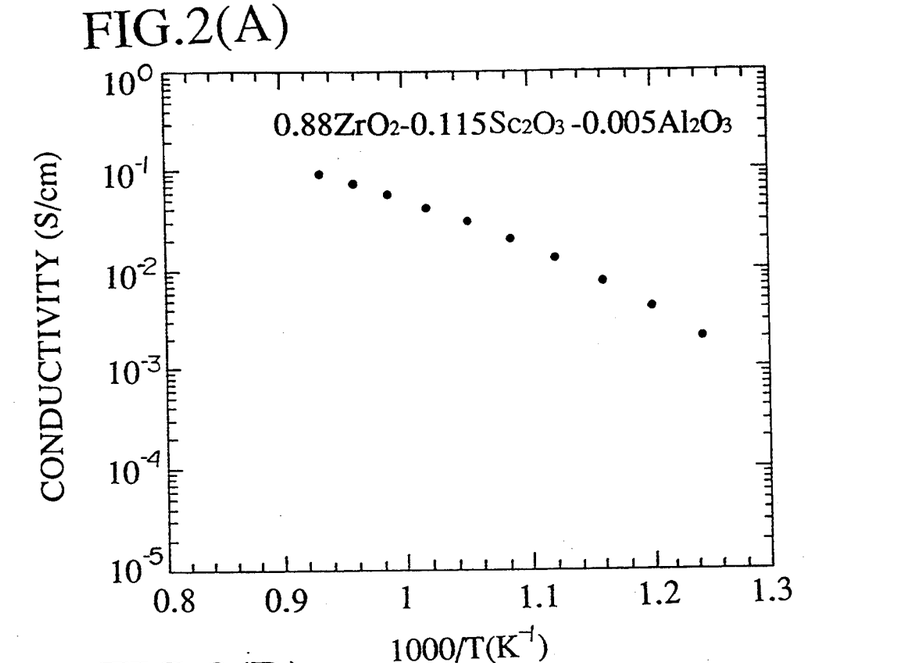
FIG. 2(a) is a diagram showing the dependence on temperature of the ion conductivity of a test oxygen ion conductor of the composition consisting of $(0.88)ZrO_2$—$(0.115)Sc_2O_3$—$(0.005)Al_2O_3$.
Figure 2B:
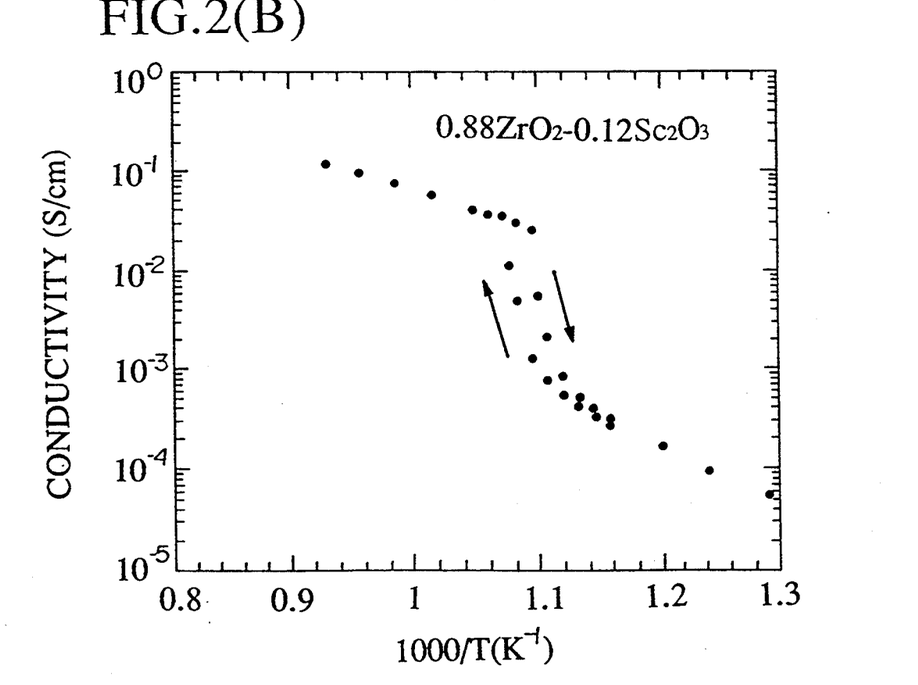
FIG. 2(b) is a diagram showing the dependence on temperature of the ion conductivity of a test oxygen ion conductor of the composition consisting of $(0.88)ZrO_2$—$(0.12)Sc_2O_3$.

FIGS. 2(a) and 2(b) show the dependence of ion conductivity on temperature. As shown in FIG. 2(b), in a test oxygen ion conductor of the composition $(0.88)ZrO_2-(0.12)Sc_2O_3$ to which $Al_2O_3$ has not been added as the sub dopant, the degree of ion conductivity varies discontinuously at temperatures near the transition temperature accompanying the phase transition in the crystal structure. In contrast, the degree of ion conductivity of a test oxygen ion conductor of the composition $(0.88)ZrO_2-(0.115)Sc_2O_3-(0.005)Al_2O_3$ to which $Al_2O_3$ has been added as the sub dopant, had results which almost entirely satisfied an approximate straight line Arrhenius relationship. Further, even in the case where doping with $Al_2O_3$, this test material showed excellent ion conductivity characteristics of $8.8 \times 10^{-2}$ ohm$^{-1}$cm$^{-1}$ at 800° C.

Table 1 below shows the degree of ion conductivity of each test material at 800° C. measured using experiments identical to those described above.

TABLE 1

| Test Material | Composition of Test Material | Conductivity (ohm$^{-1}$ cm$^{-1}$) |
| --- | --- | --- |
| 1. | $(0.88)ZrO_2-(0.115)Sc_2O_3-(0.005)Al_2O_3$ | $8.8 \times 10^{-2}$ |
| 2. | $(0.88)ZrO_2-(0.10)Sc_2O_3-(0.02)Al_2O_3$ | $7.1 \times 10^{-2}$ |
| 3. | $(0.88)ZrO_2-(0.08)Sc_2O_3-(0.04)Al_2O_3$ | $6.2 \times 10^{-2}$ |
| 4. | $(0.88)ZrO_2-(0.06)Sc_2O_3-(0.06)Al_2O_3$ | $5.1 \times 10^{-2}$ |
| 5. | $(0.88)ZrO_2-(0.04)Sc_2O_3-(0.08)Al_2O_3$ | $4.8 \times 10^{-2}$ |
| 6. | $(0.88)ZrO_2-(0.02)Sc_2O_3-(0.010)Al_2O_3$ | $2.2 \times 10^{-2}$ |
| 7. | YSZ | $2 \times 10^{-2}$ |

All of the test materials shown in Table 1 displayed a degree of ion conductivity at a temperature of 800° C. which was higher than $2 \times 10^{-2}$, which is the ion conductivity value for YSZ. As for the crystal structure, the cubic crystal structure was stable from room temperature to 800° C. Additionally, although the degree of ion conductivity was slightly reduced when even a small amount of $SiO_2$ was added to the aforementioned material as a sintering additive, there was no change in the relative effects.

EXAMPLE 2

Observing the composition limits of $(1-x-y)ZrO_2-xSc_2O_3-yAl_2O_3$ (where: $0.07 \leq x+y \leq 0.13$ and, $0.005 \leq y \leq 0.02$), the powder materials were combined so as to attain the composition limits shown in Table 2, and then were well mixed to form pellets of a diameter of 20 mm and a thickness of 2 mm. These pellets were sintered for 60 hours at 1620° C. in air, and in this manner a plurality of test ion conductors were produced. After characterizing the crystal structure of the test materials using powder X-ray diffraction, the ion conductivity was determined from measurements of their complex impedance in the frequency range 10 Hz ~ 1 MHz with an impedance analyzer.

As a result of the addition of the sub dopant $Al_2O_3$, the rhombohedral phase did not appear in the crystal structure, and the cubic crystal structure was stable from room temperature.

Table 2 shows the results for the degree of ion conductivity of each test material at 800° C. when measured by the same method as used in Example 1.

TABLE 2

| Test Material | Composition of Test Material | Conductivity (ohm$^{-1}$ cm$^{-1}$) |
| --- | --- | --- |
| 8. | $(0.88)ZrO_2-(0.115)Sc_2O_3-(0.005)Al_2O_3$ | $8.8 \times 10^{-2}$ |
| 9. | $(0.88)ZrO_2-(0.110)Sc_2O_3-(0.01)Al_2O_3$ | $8.6 \times 10^{-2}$ |
| 10. | $(0.88)ZrO_2-(0.105)Sc_2O_3-(0.015)Al_2O_3$ | $8.3 \times 10^{-2}$ |
| 11. | $(0.88)ZrO_2-(0.100)Sc_2O_3-(0.020)Al_2O_3$ | $8.1 \times 10^{-2}$ |
| 12. | $(0.88)ZrO_2-(0.095)Sc_2O_3-(0.025)Al_2O_3$ | $5.7 \times 10^{-2}$ |

As a result of the addition of the sub dopant $Al_2O_3$, the rhombohedral phase did not appear in the crystal structure, and the cubic crystal structure was stable from room temperature.

In all the test materials within the composition limits of $0.005 \leq y \leq 0.02$ shown in Table 2, a degree of ion conductivity which was three or more times higher than $2 \times 10^{-2}$, which is the ion conductivity value of YSZ, was shown at a temperature of 800° C. As for the crystal structure, the cubic crystal structure was stable from room temperature. Additionally, although the ion conductivity was slightly reduced when even a small amount of $SiO_2$ was added to the aforementioned material as a sintering additive, there was no change in relative effects.

EXAMPLE 3

Observing the composition limits of $(1-x-y)ZrO_2-xSc_2O_3-yAl_2O_3$ (where: $0 < x+y < 0.16$ and, $x > 0$, $y > 0$), the powdered materials were combined so as to attain the composition limits shown in Table 3, and then were well mixed to form pellets of a diameter of 20 mm and a thickness of 2 mm. These pellets were sintered for 60 hours at 1620° C. in air, and in this manner a plurality of test ion conductors were produced. After characterizing the crystal structure of the test materials using powder X-ray diffraction, the ion conductivity was determined from measurements of their complex impedance in the frequency range 10 Hz ~ 1 MHz with an impedance analyzer.

Table 3 shows the results for the degree of ion conductivity of each test material at 800° C. when measured by the same method as used in Example 1.

TABLE 3

| Test Material | Composition of Test Material | Conductivity (ohm$^{-1}$ cm$^{-1}$) |
|---|---|---|
| 13. | $(0.96)ZrO_2$—$(0.02)Sc_2O_3$—$(0.02)Al_2O_3$ | $2.4 \times 10^{-2}$ |
| 14. | $(0.94)ZrO_2$—$(0.04)Sc_2O_3$—$(0.02)Al_2O_3$ | $3.1 \times 10^{-2}$ |
| 15. | $(0.92)ZrO_2$—$(0.06)Sc_2O_3$—$(0.02)Al_2O_3$ | $6.2 \times 10^{-2}$ |
| 16. | $(0.90)ZrO_2$—$(0.08)Sc_2O_3$—$(0.02)Al_2O_3$ | $7.3 \times 10^{-2}$ |
| 17. | $(0.88)ZrO_2$—$(0.10)Sc_2O_3$—$(0.02)Al_2O_3$ | $7.1 \times 10^{-2}$ |
| 18. | $(0.86)ZrO_2$—$(0.12)Sc_2O_3$—$(0.02)Al_2O_3$ | $2.4 \times 10^{-2}$ |
| 19. | $(0.84)ZrO_2$—$(0.14)Sc_2O_3$—$(0.02)Al_2O_3$ | $2.1 \times 10^{-2}$ |

All the test materials within the composition limits of $x+y<0.16$ show a degree of ion conductivity at a temperature of 800° C. which is higher than $2\times10^{-2}$, which is the ion conductivity value for YSZ. As a result of the addition of the sub dopant $Al_2O_3$, the rhombohedral phase did not appear in the crystal structure, and the cubic structure was stable from room temperature. Additionally, although the degree of ion conductivity was slightly reduced when even a small amount of $SiO_2$ was added to the afornentioned material as a sintering additive, there was no change in relative effects.

EXAMPLE 4

Observing the composition limits of $(1-x-y)ZrO_2$—$xSc_2O_3$—$yAl_2O_3$ (where: $0.07<x+y<0.13$ and $0.005\leq y\leq0.02$), the powdered materials were combined so as to attain the composition limits shown in Table 4, and then were well mixed to form pellets of a diameter of 20 mm and a thickness of 2 mm. These pellets were sintered for 60 hours at 1620° C. in air, and in this manner a plurality of test ion conductors were produced. After characterizing the crystal structure of the test materials using powder X-ray diffraction, the ion conductivity was determined from measurements of their complex impedance in the frequency range 10 Hz~1 MHz with an impedance analyzer.

Table 4 shows the results for the degree of ion conductivity of each test material at 800° C. when measured by the same method as used in Example 1.

TABLE 4

| Test Material | Composition of Test Material | Conductivity (ohm$^{-1}$ cm$^{-1}$) |
|---|---|---|
| 20. | $(0.93)ZrO_2$—$(0.065)Sc_2O_3$—$(0.005)Al_2O_3$ | $6.8 \times 10^{-2}$ |
| 21. | $(0.92)ZrO_2$—$(0.075)Sc_2O_3$—$(0.005)Al_2O_3$ | $7.5 \times 10^{-2}$ |
| 22. | $(0.91)ZrO_2$—$(0.085)Sc_2O_3$—$(0.005)Al_2O_3$ | $8.8 \times 10^{-2}$ |
| 23. | $(0.90)ZrO_2$—$(0.095)Sc_2O_3$—$(0.005)Al_2O_3$ | $10.3 \times 10^{-2}$ |
| 24. | $(0.89)ZrO_2$—$(0.105)Sc_2O_3$—$(0.005)Al_2O_3$ | $10.6 \times 10^{-2}$ |
| 25. | $(0.88)ZrO_2$—$(0.115)Sc_2O_3$—$(0.005)Al_2O_3$ | $8.9 \times 10^{-2}$ |
| 26. | $(0.87)ZrO_2$—$(0.125)Sc_2O_3$—$(0.005)Al_2O_3$ | $7.2 \times 10^{-2}$ |
| 27. | $(0.86)ZrO_2$—$(0.135)Sc_2O_3$—$(0.005)Al_2O_3$ | $5.9 \times 10^{-2}$ |

All the test materials within the composition limits of $0.07\leq x+y\leq0.13$ show a degree of ion conductivity at a temperature of 800° C. which is three or more times higher than $2\times10^{-2}$, which is the ion conductivity value for YSZ. As a result of the addition of the sub dopant $Al_2O_3$, the rhombohedral phase did not appear in the crystal structure, and the cubic structure was stable from room temperature. Additionally, although the ion conductivity was slightly reduced when even a small amount of $SiO_2$ was added to the aforementioned material as a sintering additive, there was no change in relative effects.

EXAMPLE 5

Figure 3:
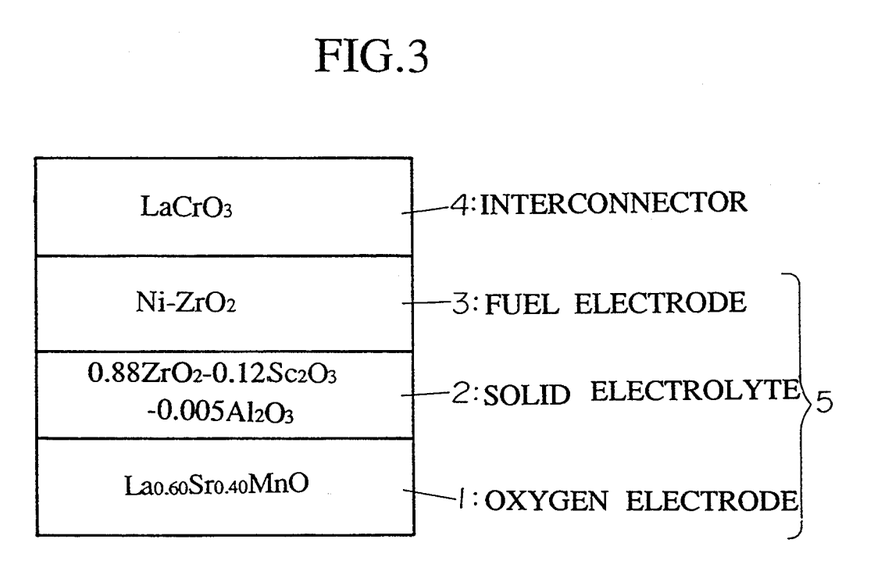
FIG. 3 is a structural diagram showing an example of a solid fuel cell of a structure wherein an interconnector is attached to a single cell.

FIG. 3 is a diagram showing one example of the structure of the fuel cell having a structure wherein an interconnector is attached to a single cell which employs an oxygen ion conductor according to the present invention.

In the cell structure of this example, the symbol 1 indicates an oxygen electrode; 2 indicates a solid electrolyte; 3 indicates a fuel electrode. The single cell 5 is comprised of oxygen electrode 1, solid electrolyte 2 and fuel electrode 3. An interconnector 4 is provided on top of the fuel electrode 3. A fuel cell is provided in simple cell 5, this fuel cell having a laminated structure formed by providing an appropriate number of laminated layers as is necessary and an interconnector 4 is provided on top of the laminated body.

$LaMnO_3$, with which Sr is doped, or the like may be used as the aforementioned oxygen electrode 1. Ni—$ZrO_2$ or the like may be used as the aforementioned fuel electrode 3. $LaCrO_3$ may be used as the aforementioned interconnector 4.

In the fuel cell of the aforementioned structure, when an oxygen gas concentration gradient is applied to both sides of a solid electrolyte, the oxygen ions move throughout the solid electrolyte as a result of diffusion.

An example of a method for producing the aforementioned single cell 5 follows below.

First, a ceramic green sheet is formed of the solid electrolyte using the doctor blade method. This is fired at 1600° C. to obtain thin ceramic plates. Next, the oxygen electrode and the fuel electrode are formed by sintering respectively at 1300° C. and 1200° C. using the single film sequential laminating method.

Next, the effects of the embodiments of the present invention will be shown by means of examples of measurements. In the example of the structure of the present invention shown in FIG. 3, a single cell of an external diameter of 20 mm, wherein the thickness of the oxygen electrode 1 and the fuel electrode 3 are 0.2 mm, and the thickness of the solid fuel electrolyte 2 is 0.1 mm, was formed. For the structural material of the solid electrolyte 2 $(0.88)ZrO_2$—$(0.115)Sc_2O_3$—$(0.005)Al_2O_3$ was employed. The current (current density)-voltage characteristics of the single cell were measured using a concentration cell with pure oxygen in one gas compartment and pure hydrogen in the other at 800° C. Further, a fuel cell was formed using YSZ as the material of the solid electrolyte and measurements were also conducted on the voltage-current characteristics thereof.

Figure 4:
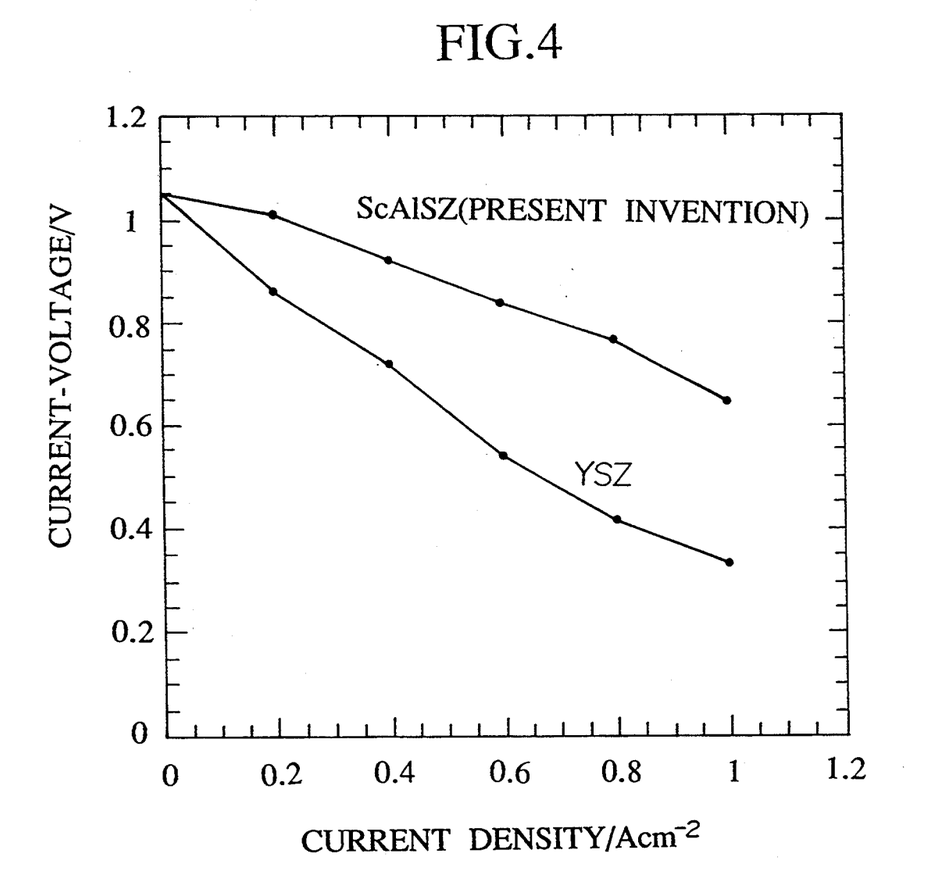
FIG. 4 is a diagram showing the current-voltage characteristics of the solid fuel cell of the structure shown in FIG. 3.

The above results are shown in FIG. 4. The curved line indicated by YSZ shows the characteristics of the conventional solid fuel cell and is given here for comparative purposes.

As shown in FIG. 4, current-voltage characteristics which are better than those of the conventional solid fuel cell using YSZ can be obtained with the fuel cell according to the embodiments of the present invention.

Moreover, even when a variety of other materials are used as the solid electrolyte to produce in the same manner the solid fuel cell according to the present invention, all show characteristics which are superior to those of conventional solid fuel cells.

Comparative Example

Figure 5:
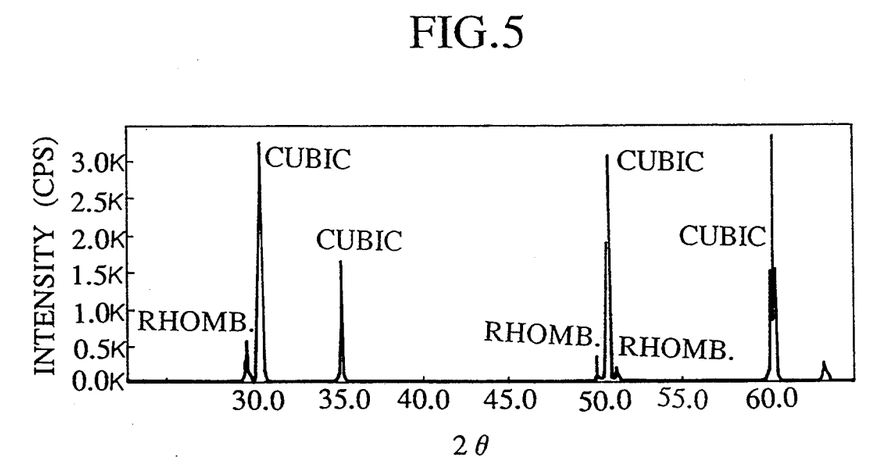
FIG. 5 is a diagram showing the X-ray diffraction pattern of a test ion conductor of the composition consisting of $(0.88)ZrO_2$—$(0.118)Sc_2O_3$—$(0.002)Al_2O_3$.
Figure 6:
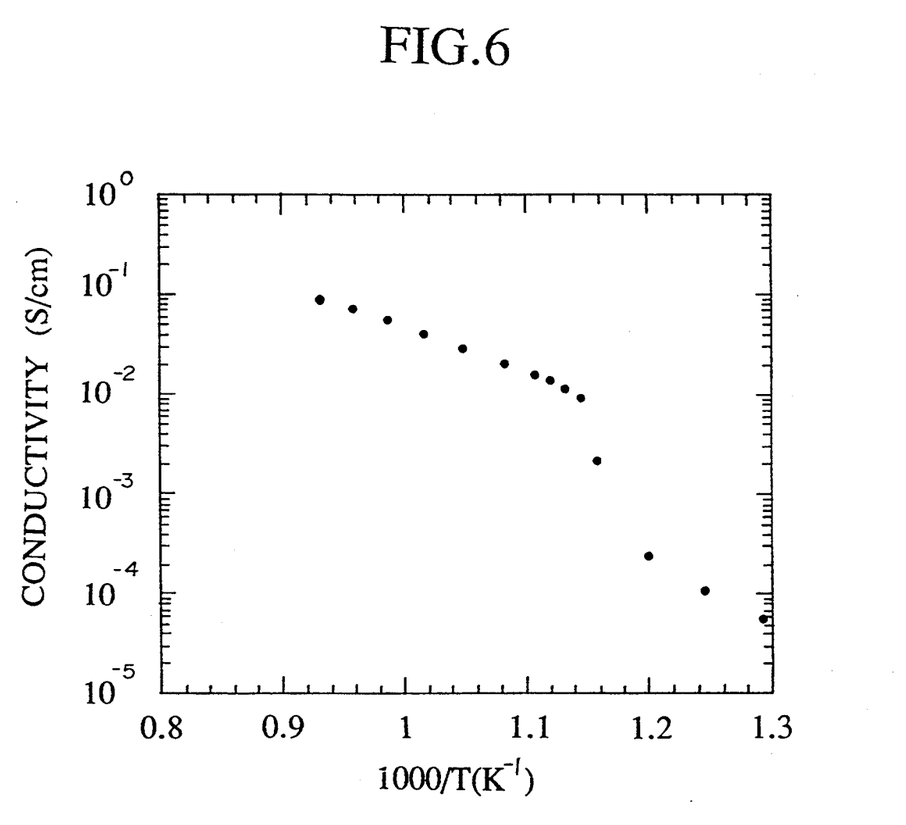
FIG. 6 is a diagram showing the dependence on temperature of the ion conductivity of the test ion conductor shown in FIG. 5.

Using a method identical to that recorded in Example 1, a test material of a composition consisting of $(0.88)ZRO_2$—$(0.118)Sc_2O_3$—$(0.002)Al_2O_3$ was produced, and the X-ray diffraction pattern and degree of ion conductivity of this test material were measured. These results are shown in FIGS. 5 and 6.

From the X-ray diffraction pattern of $(0.88)ZrO_2$—$(0.118)Sc_2O_3$—$(0.002)Al_2O_3$, this test material has a mixed phase of cubic and rhombohedral symmetry and it became clear that at a quantity of 0.002 Sc, namely where the quantity of Sc fell below 0.005, phase transitions occurred at a temperature of approximately 600° C.

We claim

1. An oxygen ion conductor consisting of a material of the formula $(1-x-y)ZrO_2$—$xSc_2O_3$—$yAl_2O_3$ where $0.87 \leq (1-x-y) \leq 0.91$, $0.085 \leq x \leq 0.125$ and $0 < y \leq 0.005$, wherein said material has a high degree of ion conductivity, a stabilized cubic crystal structure at room temperature and above, a high degree of mechanical strength when heat cycled, and only a small change in conductivity at high temperatures over time, and wherein the crystal structure is a stabilized cubic crystal structure in which phase transitions do not occur over the entire temperature range from room temperature to at least the melting point of the material which exceeds at least 800° C.

2. An oxygen ion conductor consisting of a material of the formula $(1-x-y)ZrO_2$—$xSc_2O_3$—$yAl_2O_3$ where $0.89 \leq (1-x-y) \leq 0.90$, $0.095 \leq x \leq 0.105$ and $0 < y \leq 0.005$, wherein said material has a high degree of ion conductivity, a stabilized cubic crystal structure at room temperature and above, a high degree of mechanical strength when heat cycled, and only a small change in conductivity at high temperatures over time, and wherein the crystal structure is a stabilized cubic crystal structure in which phase transitions do not occur over the entire temperature range from room temperature to at least the melting point of the material which exceeds at least 800° C.

3. A solid fuel cell having one or a plurality of cells formed by providing a fuel electrode and an oxygen electrode to the sides of a solid electrolyte material of one of claims 1 or 2, wherein an interconnector is connected to the fuel electrode of the cell.

4. A solid fuel cell according to claim 3, wherein said interconnector comprises $LaCrO_3$.

* * * * *